(12) United States Patent
Howarth et al.

(10) Patent No.: US 7,838,757 B2
(45) Date of Patent: Nov. 23, 2010

(54) FREQUENCY SPECTRUM CONVERSION TO NATURAL HARMONIC FREQUENCIES PROCESS

(76) Inventors: Alan Steven Howarth, 4455 Commonwealth Ave., La Canada, CA (US) 91011; Wesley Howard Bateman, P.O. Box 202, Dolan Springs, AZ (US) 86441

( * ) Notice: Subject to any disclaimer, the term of this patent is extended or adjusted under 35 U.S.C. 154(b) by 164 days.

(21) Appl. No.: 11/915,670

(22) PCT Filed: Jun. 1, 2006

(86) PCT No.: PCT/US2006/021584

§ 371 (c)(1),
(2), (4) Date: Jun. 30, 2008

(87) PCT Pub. No.: WO2006/130867

PCT Pub. Date: Dec. 7, 2006

(65) Prior Publication Data

US 2009/0165631 A1 Jul. 2, 2009

(51) Int. Cl.
*G10H 7/00* (2006.01)
*H02M 5/00* (2006.01)
(52) U.S. Cl. .......................... 84/619; 84/445
(58) Field of Classification Search ............... 84/483.2, 84/616, 654, 445, 657, 619
See application file for complete search history.

(56) References Cited

U.S. PATENT DOCUMENTS

| 5,117,727 | A | * | 6/1992 | Matsuda | 84/619 |
| 5,442,129 | A | * | 8/1995 | Mohrlok et al. | 84/637 |
| 5,641,926 | A | * | 6/1997 | Gibson et al. | 84/603 |
| 5,675,100 | A | * | 10/1997 | Hewlett | 84/462 |
| 6,958,442 | B2 | * | 10/2005 | Moussa | 84/645 |
| 6,979,769 | B1 | * | 12/2005 | Majima et al. | 84/645 |
| 7,179,979 | B2 | * | 2/2007 | Howarth et al. | 84/483.2 |
| 2005/0268774 | A1 | * | 12/2005 | Howarth et al. | 84/483.2 |

OTHER PUBLICATIONS wikipedia.org—"Musical tuning," viewed Aug. 1, 2010.*

* cited by examiner

*Primary Examiner*—Jeffrey Donels
(74) *Attorney, Agent, or Firm*—Kelly Lowry & Kelley, LLP

(57) ABSTRACT

A process for converting standard musical notes to Ra format musical notes comprising inputting a signal of standard musical notes, analyzing the frequency of each note in the signal, selecting a Ra format natural harmonic resonance, converting the frequency of each note in the signal to a Ra format frequency corresponding to the selected Ra format natural harmonic resonance, and outputting signal consisting of the converted notes. An apparatus including a processor capable of performing the inventive process on a signal of standard musical notes. The apparatus (12) includes a signal input port (14) and a signal output port, means for converting the frequency of standard musical notes to a corresponding frequency of Ra musical notes, means for selecting a Ra format natural harmonic resonance, and a frequency analyzer (26).

7 Claims, 14 Drawing Sheets

| GREEN | 1st oct. |
|---|---|
| o | 72.9 |
| C | .636396103 |
| o | 82.0125 |
| D | .715945616 |
| o | 91.125 |
| E | .795495129 |
| o | 97.2 |
| F | .848528137 |
| o | 109.35 |
| G | .954594155 |
| o | 60.75 |
| A | .530330086 |
| o | 68.34375 |
| B | .596621347 |

Speed of Light in KR/NST:
298,310.673315

PI Value
3.142696805

1 Pi degree:
.008729713

RATIO:
Green Freq. in
NST x 1.004967247 =
Standard Freq. in SST

| GREEN CONV. | 1st oct. |
|---|---|
| o | 72.9 |
| C | .635955836 |
| o | 82.0125 |
| D | .715450315 |
| o | 91.125 |
| E | .794944795 |
| o | 97.2 |
| F | .847941115 |
| o | 109.35 |
| G | .953933754 |
| o | 60.75 |
| A | .529963197 |
| o | 68.34375 |
| B | .596208597 |

Speed of Light in KR/NST:
299,792.4562

PI Value
3.15830360

1 Pi degree:
.008773076

FIG. 2A

| BLUE | 1st oct. |
|---|---|
| o | 72.9 |
| C | .636619785 |
| o | 82.0125 |
| D | .71519258 |
| o | 91.125 |
| E | .795774732 |
| o | 97.2 |
| F | .848826380 |
| o | 109.35 |
| G | .954929678 |
| o | 60.75 |
| A | .530516488 |
| o | 68.34375 |
| B | .596831049 |

| BLUE CONV. | 1st oct. |
|---|---|
| o | 72.9 |
| C | .636179363 |
| o | 82.0125 |
| D | .715701783 |
| o | 91.125 |
| E | .79522403 |
| o | 97.2 |
| F | .848239151 |
| o | 109.35 |
| G | .954269045 |
| o | 60.75 |
| A | .530149469 |
| o | 68.34375 |
| B | .596418153 |

Speed of Light in KR/NST: 298,415.524093

PI Value 3.143801409

1 Pi degree: .008732782

RATIO:
Blue Freq. in NST x 1.004614144 = Standard Freq. in Ss.

Speed of Light in KM/NST: 299,792.4562

PI Value 3.158307360

1 Pi degree: .008773076

FIG. 2B

| HYMAJOR | 1st oct. |
|---|---|
| o | 72.9 |
| C | .6377292 |
| o | 82.0125 |
| D | .71744535 |
| o | 91.125 |
| E | .7971615 |
| o | 97.2 |
| F | .8503056 |
| o | 109.35 |
| G | .9665938 |
| o | 60.75 |
| A | .531441 |
| o | 68.34375 |
| B | .597871125 |

Speed of Light in KR/NST: 298,935.562504

PI Value 3.14928

1 Pi degree: .008748

RATIO:
HyMajor Freq. in NST x 1.002866483 = Standard Freq. in Ss.

| HYMAJOR CONV. | 1st oct. |
|---|---|
| o | 72.9 |
| C | .637288011 |
| o | 82.0125 |
| D | .716949012 |
| o | 91.125 |
| E | .796610014 |
| o | 97.2 |
| F | .849717348 |
| o | 109.35 |
| G | .955932016 |
| o | 60.75 |
| A | .531073342 |
| o | 68.34375 |
| B | .597457510 |

Speed of Light in KM/NST: 299,792.4562

PI Value 3.158307360

1 Pi degree: .008773076

FIG. 2C

| HYMINOR | 1st oct. |
|---|---|
| o | 72.9 |
| C | .635065793 |
| o | 82.0125 |
| D | .714449017 |
| o | 91.125 |
| E | .793832241 |
| o | 97.2 |
| F | .84675439 |
| o | 109.35 |
| G | .952598689 |
| o | 60.75 |
| A | .529221494 |
| o | 68.34375 |
| B | .595374181 |

| HYMINOR CONV. | 1st oct. |
|---|---|
| o | 72.9 |
| C | .634626446 |
| o | 82.0125 |
| D | .713954752 |
| o | 91.125 |
| E | .793283058 |
| o | 97.2 |
| F | .846168595 |
| o | 109.35 |
| G | .951939669 |
| o | 60.75 |
| A | .528855372 |
| o | 68.34375 |
| B | .594962293 |

Speed of Light in KR/NST: 297,687.090394

PI Value 3.136127372

1 Pi degree: .008711465

RATIO: Hyminor Freq. in NST x 1.0070072412 = Standard Freq. in SST

Speed of Light in KM/SST: 299,792.4562

PI Value 3.15830360

1 Pi degree: .008773076

FIG. 2D

| RED | 1st oct. |
|---|---|
| o | 72.9 |
| C | .6361725 |
| o | 82.0125 |
| D | .715694063 |
| o | 91.125 |
| E | .795215625 |
| o | 97.2 |
| F | .84823 |
| o | 109.35 |
| G | .95425875 |
| o | 60.75 |
| A | .53014375 |
| o | 68.34375 |
| B | .596411719 |

Speed of Light in KR/NST: 298,205.859377

PI Value 3.141592---

1 Pi degree: .0087266646

RATIO:
Red Freq. in NST x 1.005320475 = Standard Freq. in SST

| RED CONV. | 1st oct. |
|---|---|
| o | 72.9 |
| C | .6357332388 |
| o | 82.0125 |
| D | .715198936 |
| o | 91.125 |
| E | .794665485 |
| o | 97.2 |
| F | .847643184 |
| o | 109.35 |
| G | .953598582 |
| o | 60.75 |
| A | .529776990 |
| o | 68.34375 |
| B | .59599914 |

Speed of Light in KM/SST: 299,792.4562

PI Value 3.15830360

1 Pi degree: .008773076

FIG. 2E

| ALPHA MAJOR CONV. | 1st oct. |
|---|---|
| o | 72.9 |
| C | .638798920 |
| o | 82.0125 |
| D | .718648785 |
| o | 91.125 |
| E | .798498650 |
| o | 97.2 |
| F | .851731894 |
| o | 109.35 |
| G | .958198380 |
| o | 60.75 |
| A | .5323332434 |
| o | 68.34375 |
| B | .598873988 |

Speed of Light in KM/SST: 299,792.456081

PI Value 3.158307360

1 Pi degree: .008773076

| ALPHA MAJOR | 1st oct. |
|---|---|
| o | 72.9 |
| C | .639241155 |
| o | 82.0125 |
| D | .7191463 |
| o | 91.125 |
| E | .799051444 |
| o | 97.2 |
| F | .85232154 |
| o | 109.35 |
| G | .958861733 |
| o | 60.75 |
| A | .5327700963 |
| o | 68.34375 |
| B | .599288583 |

Speed of Light in KR/NST: 299,644.291641

PI Value 3.156746446

1 Pi degree: .00876874

RATIO:
Alpha Major Freq. in NST x 1.00494468 = Standard Freq. in SST

FIG. 2F

| OMEGA MAJOR | 1st oct. |
|---|---|
| C | 72.9 |
| o | .64 |
| D | 82.0125 |
| o | .72 |
| E | 91.125 |
| o | .8 |
| F | 97.2 |
| o | .85333--- |
| G | 109.35 |
| o | .96 |
| A | 60.75 |
| o | .5333--- |
| B | 68.34375 |
| o | .6 |

Speed of Light in KR/NST:
300,000.00

PI Value
3.160493827

1 Pi degree:
.008779150

RATIO:
Omega Major Freq. in
KR/NST x .999308187 =
Standard Freq. in sst.

| OMEGA MAJOR CONV. | 1st oct. |
|---|---|
| C | 72.9 |
| o | .639557240 |
| D | 82.0125 |
| o | .719501895 |
| E | 91.125 |
| o | .799446549 |
| F | 97.2 |
| o | .852742986 |
| G | 109.35 |
| o | .959335859 |
| A | 60.75 |
| o | .532964367 |
| B | 68.34375 |
| o | .599584913 |

Speed of Light in KM/SST:
299,792.456081

PI Value
3.158307360

1 Pi degree:
.008773076

FIG. 2G

| OMEGA MINOR | | 1st oct. |
|---|---|---|
| | o | 72.9 |
| C | o | .6328152 |
| | o | 82.0125 |
| D | o | .711914063 |
| | o | 91.125 |
| E | o | .791015625 |
| | o | 97.2 |
| F | o | .84375 |
| | o | 109.35 |
| G | o | .94921875 |
| | o | 60.75 |
| A | o | .52734375 |
| | o | 68.34375 |
| B | o | .593261719 |

Speed of Light in KR/NST: 296,630.859379

PI Value 3.128709695

1 Pi degree: .008680556

RATIO:
Omega Minor Freq. in NST x 1.010658354 = Standard Freq. in SST

| OMEGA MINOR CONV. | | 1st oct. |
|---|---|---|
| | o | 72.9 |
| C | o | .632374712 |
| | o | 82.0125 |
| D | o | .711422155 |
| | o | 91.125 |
| E | o | .790468390 |
| | o | 97.2 |
| F | o | .843166283 |
| | o | 109.35 |
| G | o | .948562068 |
| | o | 60.75 |
| A | o | .526978927 |
| | o | 68.34375 |
| B | o | .592851293 |

Speed of Light in KM/SST: 299,792.4562

PI Value 3.158307360

1 Pi degree: .008773076

FIG. 2H

| ALPHA MINOR | 1st oct. |
|---|---|
| o | 72.9 |
| C | .633563713 |
| o | 82.0125 |
| D | .712759177 |
| o | 91.125 |
| E | .791954642 |
| o | 97.2 |
| F | .844751618 |
| o | 109.35 |
| G | .95034557 |
| o | 60.75 |
| A | .527969761 |
| o | 68.34375 |
| B | .593965981 |

Speed of Light in KR/NST: 296,982.9906

PI Value 3.128709695

1 Pi degree: .008690860

RATIO:
Alpha Minor Freq. in NST x 1.009460022 = Standard Freq. in SST

| ALPHA MINOR CONV. | 1st oct. |
|---|---|
| o | 72.9 |
| C | .633125405 |
| o | 82.0125 |
| D | .712266082 |
| o | 91.125 |
| E | .791406757 |
| o | 97.2 |
| F | .844167207 |
| o | 109.35 |
| G | .949688108 |
| o | 60.75 |
| A | .527604505 |
| o | 68.34375 |
| B | .593555068 |

Speed of Light in KM/SST: 299,792.4562

PI Value 3.158307360

1 Pi degree: .008773076

FIG. 2I

RA Music Conversion Chart

| Note Category | Note Name | Standard Tempered Note Frequency to RA Frequency | | | | |
|---|---|---|---|---|---|---|
| | | Freq. In Standard Seconds | Percentage of Change | Change in Musical "Cents" | | |
| Standard Note "A" 2nd Octave | A2 | 110Hz | None | None | | |
| | | | | | | |
| RA Formats | | RA Values In Std. Seconds | Difference Std to RA | "Cents" Change Exact | | "Cents" Rounded |
| Omega Major | A2 | 106.5928734 Hz | 0.969026122 | -52.9 | | -53 |
| Alpha Major | A2 | 106.4664868 Hz | 0.967877152 | -55.1 | | -55 |
| Hydrogen Major | A2 | 106.2146684 Hz | 0.965587894 | -59 | | -59 |
| Blue | A2 | 106.0298938 Hz | 0.963908125 | -61.9 | | -62 |
| Green | A2 | 105.9926394 Hz | 0.963569449 | -62.6 | | -62.5 |
| Red | A2 | 105.955398 Hz | 0.963230891 | -63.1 | | -63.1 |
| Hydrogen Minor | A2 | 105.7710744 Hz | 0.961555222 | -66 | | -66 |
| Alpha Minor | A2 | 105.520901 Hz | 0.959280918 | -70 | | -70 |
| Omega Minor | A2 | 105.3957854 Hz | 0.958143504 | -72 | | -72 |
| | | | | | | |
| Standard Note "A" 4th Octave | A4 | 440 Hz | None | None | | |
| | | | | | | |
| RA Formats | | Ra Value in Std. Hz | Difference Std to RA | "Cents" Change Exact | | "Cents" Rounded |
| Omega Major | A4 | 426.3714936 Hz | 0.969026122 | -52.9 | | -53 |
| Alpha Major | A4 | 425.8659472 Hz | 0.967877152 | -55.1 | | -55 |
| Hydrogen Major | A4 | 424.8586736 Hz | 0.965587894 | -59 | | -59 |
| Blue | A4 | 424.1195752 Hz | 0.963908125 | -61.9 | | -62 |
| Green | A4 | 423.9705576 Hz | 0.963569449 | -62.6 | | -62.5 |
| Red | A4 | 423.821592 Hz | 0.963230891 | -63.1 | | -63.1 |
| Hydrogen Minor | A4 | 423.084276 Hz | 0.961555222 | -66 | | -66 |
| Alpha Minor | A4 | 422.083604 Hz | 0.959280918 | -70 | | -70 |
| Omega Minor | A4 | 421.5831416 Hz | 0.958143504 | -72 | | -72 |

FIG. 3

Multi-Channel Diagram of Pyramid Processor
Channel Flow Chart for "N" number of simulation Signal Data Streams
Simplified Flow Chart for "N" number of simulation Signal Data Streams
Signal Inputs
Channel 1
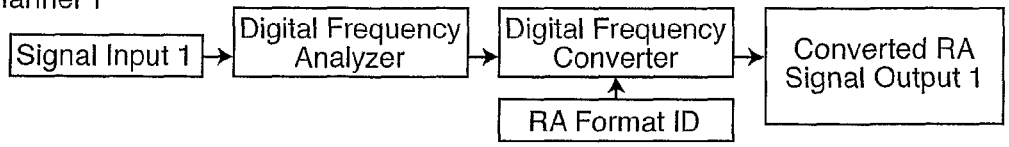
Channel 2
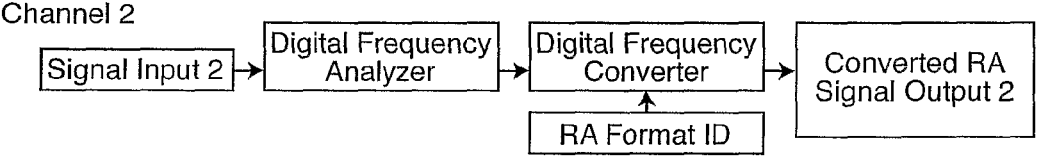
Channel 3
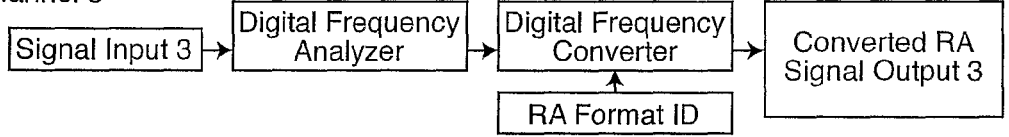
Channel 4
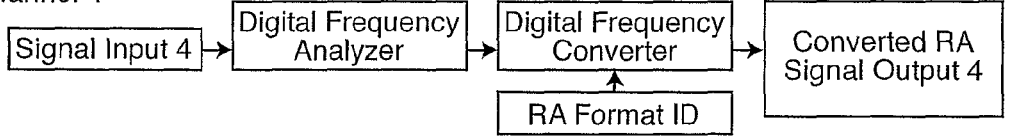
Channel 5
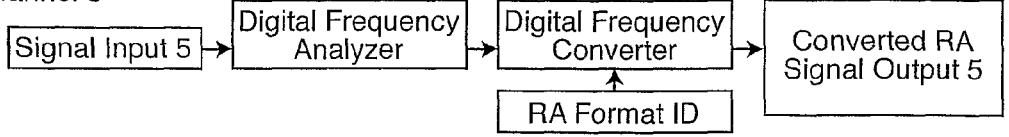
Channel N
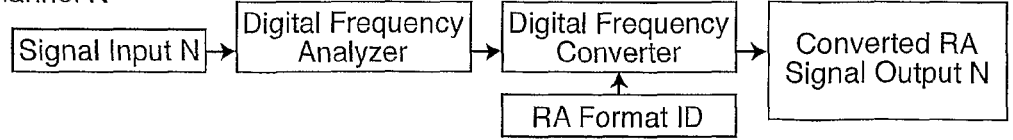
FIG. 5

FREQUENCY SPECTRUM CONVERSION TO NATURAL HARMONIC FREQUENCIES PROCESS

BACKGROUND OF THE INVENTION

Harmonic studies of frequency sets related to nature, natural events (phenomena), elements, astronomy, mathematics, and human form have been useful in identification of vibrations related to science, mechanics, medicine, psychology and human functions.

Two common aspects of frequency sets are music and musical scales.

The standard musical frequency for the fourth octave of 'A' in musical instruments such as the piano is presently 440 Hz (Hz=cycles per standard second). Equal temperament into a $\frac{1}{12}$th interval is the way that all modern keyboard instruments are manufactured. This standard has been in use throughout the 20th century. However, this choice is not necessarily correct or harmonically tuned to nature.

Scientific author, Isaac Asimov, has stated that music is made of musical intervals. (octaves, fourths, fifths, etc.) The exact frequency and exact harmonic sets are not the basis of music; it is the alternation of intervals that is perceived as a melody and harmonic chord structure. The choice of A=440 Hz for the calibration of music is to a degree arbitrary.

Composers and performers of the past had no such standards. A Mozart or Bach would simply listen to a note and intuitively decide that it sounded 'right' to them with the choice made; they would have all the players of the ensemble adjust to the chosen tuning. This method was satisfactory for most early instrumental families. The introduction of polyphonic keyboard instruments such as the harpsichord and later the piano presented a new problem with intuitive tunings. The numerous individual strings were too difficult to adjust quickly, and therefore the need for standard tuning arose. To facilitate the need for standards, we use A=440 Hz today.

But, what of tunings that seemed natural to these composers of centuries ago? Many other cultures do not use western methods of tuning. Was there something lost with the creation of modern standards? Remember, music is defined by intervals not necessarily frequency. Is there a 'right or correct' note?

In 1975 researcher Wesley H. Bateman began studies of many ancient building sites world wide, particularly the Great Pyramid of Giza, Egypt. This work has spanned the last 25 years, from which he has rediscovered the mathematical system used by the original architects in defining the measurements of all aspects of the ancient structure. He has titled this system The Ra System ((©1987) and the units of measure derived from it the 'Rods of Amon Ra' (©1987), named for the ancient Egyptian sun god 'Amon Ra.' In fact the Ra System of mathematics has proven to be the natural system of mathematics which nature uses to describe itself. Among the mathematical properties contained in the 'Ra System' are formats of frequency and resonance that relate to nature and natural events. These are mathematically perfect sets that are used by nature. Presently, we know of nine Ra mathematical formats. Each format has its own version for all of the known mathematical constants such as: Pi, Phi, Balmer constant for hydrogen, Rydberg constant for hydrogen, and the speed of light—to name just a few.

In the fall of 1975, while engaged in e.e.g. biofeedback research Bateman came upon a scientific paper written by Drs. C. Polk and F. Fitchen of the University of Rhode Island. The paper was titled: 'The Schumann Resonances of the Earth-Ionosphere Cavity—Extremely Low Frequency Reception at Kingston R.I.' The report can be found in the Journal of Research of the National Bureau of Standards—D Radio Propagation—Vol. 66D, No. 3, May-June, 1962.

That paper described the instrumentation that was used at the time to receive and record extremely low frequency electromagnetic wave trains (elf waves) that are a by-product of lightning strikes occurring all over the Earth. The elf waves are contained within the natural resonance cavity (waveguide) composed of the surface of the Earth and the 'D' layer of the ionosphere. The resonance cavity of the Earth is analogous to the resonance cavity of a guitar or violin.

His interest in lightning generated elf waves was heightened when he realized that the waves had the same frequencies, frequency averages and wave shapes (envelopes) as do human brain waves. The frequency range of the elf waves is between 0.02 cycles per second (Hz) and 13.5 Hz. The most frequently occurring elf wave frequency is 10.6 Hz. The frequency of 10.6 Hz is very important to the present invention.

The human brain produces 4 distinct brain wave patterns that are named after letters from the Greek alphabet. These brain wave patterns along with their frequencies are described below:

Delta: 0.02 Hz up to and including 3 Hz. A person who is either asleep or unconscious produces delta brain waves.

Theta: 3 Hz up to and including 7 Hz. A person who is either asleep or unconscious also generates Theta waves. Theta waves have been linked to the state of dreaming that is accompanied by 'rapid eye movement' (REM sleep). Hyperactive children have been known to produce Theta waves while awake.

Alpha: 7 Hz up to and including 13.5 Hz. Alpha brain waves are generated when a person is relaxed or in a state of meditation.

Beta: 13.5 Hz. to 27 Hz. A person produces Beta waves when awake and totally aware of the world around them. Brain waves above 27 Hz. are known to occur on occasion and are called 'High Beta.'

The most frequently generated Alpha brain wave produced by a meditating person is 10.6 Hz. As stated above, 10.6 Hz is also the most frequently occurring lightning generated elf wave. In addition, the last frequency of Alpha brain waves and the first ceiling frequency of the elf waves are in both cases 13.5 Hz. In October 1975, Wes Bateman discovered a relationship between these frequencies and the mathematical constant Pi (3.1415926). The ratio of 10.6 Hz to 13.5 Hz is 0.785185185. The ratio 0.785185185 is almost directly proportional to Pi (3.1415926), i.e., 0.785185185×4=3.1407407. This relationship demonstrates that brain wave frequencies are Pi-based.

Similar to the relationship between alpha brain wave/elf wave frequencies and the mathematical constant Pi, Wes Bateman also discovered a proportional relationship between the last frequency of Alpha brain waves or the first ceiling frequency of the elf wave phenomenon (which is in both cases 13.5 cycles per n.s.t.) and the mathematical constant Phi. When 13.5 cycles per n.s.t. is multiplied by 12 the result is 1.62. This result is very close in value to the number 1.61803389 (Phi). Phi and its associated Fibonacci ratios are found in the proportions and shapes of every living thing, including humans.

The above proportional relationships led Mr. Bateman to the conclusion that our brains function on the order of Pi and our bodies are proportioned on the order of Phi. Knowing that both Pi and Phi are well known constants that relate to the geometry of the Great Pyramid of Giza, Mr. Bateman under took a full time 25-year study of the ancient structure. This long term study led to the discovery of the Ra System of mathematics.

The Nine Known Ra Formats

While studying the geometry of the Great Pyramid of Egypt Wes Bateman encountered several numbers that were close in value to the square root of 2. These numbers were: 1.41371666 - - - and 1.414710633. Note that 1.41371666 - - - ×1.414710633=2. These numbers were arbitrarily named Red and Blue numbers. The actual value of the square root of 2 is 1.414213562. This value was then named a Green number; Red, Blue and Green being the basic constituents of the color white. After considerable research it was realized that the Ra System of Mathematics consists of at least 9 formats. The names of the nine known Ra formats and their related values of Pi are as follows: Omega Major; Alpha Major; Hydrogen Major; Blue; Green; Red; Hydrogen Minor; Alpha Minor; and Omega Minor. There is a relationship between each of the mirror image formats (Omega Major/Omega Minor-Alpha Major/Alpha Minor-Hydrogen Major/Hydrogen Minor-Blue/Red) and the central format (Green).

For the sake of brevity 5 values for the square root of 2 and five values for Pi are seen in the chart below:

|     | Omega Minor | Red         | Green       | Blue        | Omega Major |
|-----|-------------|-------------|-------------|-------------|-------------|
| #2  | 1.40625     | 1.41371666… | 1.4142135562| 1.414710633 | 1.4222…     |
| Pi  | 3.125       | 3.141592…   | 3.142696805 | 3.143801409 | 3.160493830 |

The names corresponding values of Pi for each of the nine Ra formats are as follows:
  Omega Major: 3.160493830
  Alpha Major: 3.156746446
  Hydrogen Major: 3.14928
  Blue: 3.143801409
  Green: 3.142696807
  Red: 3.141592592 - - -
  Hydrogen Minor: 3.136127372
  Alpha Minor: 3.128709695
  Omega Minor: 3.125

Note: Omega Minor Pi×Omega Major Pi 9.87654321 (Green Pi squared) or Red Pi×Blue Pi=9.87654321 (Green Pi squared). The Green format is the central format.

From the list above, the ratios that relate one format to another can be easily calculated by multiplying the corresponding related values (i.e., Major/Minor or Blue/Red) and comparing the number to the square of Green Pi.

In the Ra system of mathematics, the units of measurement are the Ram (which approximates the meter in size), the Ra foot (⅓ of a Ram), and Ra inches (1/12 of a Ra foot and 1/40 of a Ram). As will be explained below, there are different Rams for each Ra format.

When dealing with frequencies one is dealing with time (cycles per second). Mr. Bateman's studies led to the realization that nature uses a unit of time—or natural second of time (n.s.t.)—that is slightly longer in duration than the standard second we presently employ. In the Ra System of Mathematics, the speed of light is 300,000.00 Omega Major kilorams per n.s.t. The speed of light in kilometers has been measured and found to be 299,792.456081 kilometers per standard second (+/−1 m). Therefore the duration of the n.s.t. is 1.000692286 standard seconds in length. This ratio is used to convert Ra musical frequencies from cycles per n.s.t. to cycles per standard second of time.

Using this conversion from standard seconds to n.s.t., the average Alpha brain wave or average elf wave frequency is 10.602875 cycles per n.s.t. Employing the same relationship to Pi demonstrated above, the ratio of 10.602875 cycles per n.s.t. to 13.5 Hz=0.7853981481—and—0.7853981481× 4=3.141592592.

The numbers: 10.602875 and 3.141592592 - - - are Red numbers. In fact, as will be described more fully below, 106.02875 cycles per n.s.t. (about 10 times the average Alpha brain wave or average elf wave frequency) is the second octave of Red 'A'.

The Ra formats apply not only to frequencies, but to electronic waves, broadcast frequency, computer systems, wave structures, biorhythms, brain waves, bio-electrical functions, botany, Earth and astronomical sciences. Other possible applications include artificial intelligence, computer sciences, broadcast, entertainment, space-time, human and veterinary medicine, chemistry, biology, botanical-agriculture (both land and sea), mining, manufacturing, aviation, air, sea and space navigation, communications—terrestrial/space, Earth and astronomical sciences. The relevance of each application is still to be determined. These discoveries are truly 'Universal'.

Accordingly, it is an object of this invention to provide a unique process to convert frequencies of standard musical notes into frequencies having a greater appeal to a listener.

It is a further object to provide a device incorporating this process.

SUMMARY OF THE INVENTION

This present invention comprises an electronic device—called the 'Pyramid Processor'—and a corresponding method that converts musical notes from standard frequencies to Ra format frequencies. The conversion of standard musical notes measured in cycles per standard seconds to Ra musical notes measured in cycles per standard seconds is based on two very important factors:

1. The ratios that exist between the various Ra formats that raise the converted music to a higher level of mathematical harmony and listening pleasure (evident either as a single Ra format or when the same note of 2, 3 or more different Ra formats are layered and heard simultaneously). This is a unique change from standard tone music which has only 1 frequency for each note on the standard 'A-440' scale.

2. The unique electronic functions built into the Pyramid Processor that assure that the converted standard musical tones are a true representation of the Ra tones measured in cycles per standard seconds and thus identical to Ra tones that could otherwise be measured exactly in natural seconds.

The apparatus for converting the frequency of standard musical notes to a corresponding frequency of Ra format musical notes comprises a processor having a signal input port and a signal output port, means for converting the frequency of standard musical notes to a corresponding frequency of Ra musical notes, means for selecting a Ra format natural harmonic resonance, and a frequency analyzer. The means for converting may comprise a software program or a hardware configuration containing all Ra format natural harmonic resonances. The means for selecting a Ra format natural harmonic resonance may comprise means for selecting two or more Ra format natural harmonic resonances and may comprise a switch, a dial, or multiple buttons having positions corresponding to each of the nine Ra formats. The apparatus may be connected to an audio device, i.e., a tuner or a computer, for transmission of a signal of standard musical notes and receipt of a signal of converted Ra format musical notes. The apparatus may also comprise means for recording an output signal, i.e., tape recorder, CD burner, computer hard drive.

The process for converting standard musical notes to Ra format musical notes comprises inputting a signal of standard musical notes, each note having a frequency, analyzing the frequency of each note in the signal of standard musical notes, selecting a Ra format natural harmonic resonance, converting the frequency of each note in the signal standard musical notes to a frequency of Ra format musical notes corresponding to the selected Ra format natural harmonic resonance, and outputting a signal of Ra format musical notes consisting of each of the converted notes. The process may further comprise a step of analyzing the frequency of each of the converted notes prior to the outputting step. The input signal may be either analog or digital, but an analog signal should be converted to a digital signal before converting the notes to a Ra format. The process may involve the conversion of signals of standard musical notes consisting of two or more audio channels which are each converted to a Ra format. The two or more audio channels of an output signal of Ra format musical notes may be layered as different audio channels are commonly layered, i.e., stereo, surround, etc.

Where as the two factors are essential for the hardware of the Pyramid Processor to electronically convert standard note music frequencies to Ra standard note music frequencies— no other variation of these factors will permit the Pyramid Processor or another device to do so. These factors form the basis for either a hard wired program or a software program that provides the same data to any variation of the Pyramid Processor.

BRIEF DESCRIPTION OF THE DRAWINGS

The accompanying drawings illustrate the invention. In such drawings:

FIGS. 2A-2I are conversion tables for the various notes in the first octave according to the nine Ra formats, as determined by the Pi measuring wheel of FIG. 1;

FIG. 3 is a conversion chart for the note 'A' in the second and fourth octaves for all nine Ra formats;

FIG. 5 is a flowchart illustrating the steps taken in a multi-channel Pyramid Processor embodying the present invention.

DETAILED DESCRIPTION OF THE PREFERRED EMBODIMENT

In the case of Ra music there are 9 frequency values for the 'A' musical tone, 9 values for the 'B' musical tone etc. That is: Red 'A', Green 'A', Blue 'A', Omega Major 'A', Omega Minor 'A', Hydrogen Major 'A', Hydrogen Minor 'A', Alpha Major 'A', and Alpha Minor 'A'. The frequency of Red 'A'×the frequency of Blue 'A' equals the frequency of Green 'A' squared. This rule is true for any 2 mirror format values of 'A' or for any other Ra musical tones which are located in their respective mirrored formats.

When Johann Sebastian Bach laid out the even-tempered clavichord he intuitively separated the notes by Ra value ratios. Therefore Bach's ratios are perfectly valid for the 9 Ra musical scales. The Bach Ratios are:

| | |
|---|---|
| A to B - | 1.125 |
| B to C - | 1.0666 - - - |
| C to D - | 1.125 |
| D to E - | 1.111 - - - |
| E to F - | 1.0666 - - - |
| F to G - | 1.125 |

The conversion of standard musical notes measured in cycles per standard seconds to Ra musical notes measured in cycles per standard seconds is based on two very important factors:

1. The ratios that exist between the various Ra formats that raise the converted music to a higher level of mathematical harmony and listening pleasure (evident either as a single Ra format or when the same note of 2, 3 or more different Ra formats are layered and heard simultaneously). This is a unique change from standard tone music which has only 1 frequency for each note on the standard 'A-440' scale.

2. The unique electronic functions built into the Pyramid Processor that assure that the converted standard musical tones are a true representation of the Ra tones measured in cycles per standard seconds and thus identical to Ra tones that could otherwise be measured exactly in natural seconds.

Using the Ra System of mathematics and the formulas described above, the conversion ratios presented in FIG. 3 and reproduced below, may be used to convert any octave of 'A' in A440 to the corresponding Ra format:

| | |
|---|---|
| Omega Major | 0.969026122 |
| Alpha Major | 0.967877152 |
| Hydrogen Major | 0.965587894 |
| Blue | 0.963908125 |
| Green | 0.963569449 |
| Red | 0.963230891 |
| Hydrogen Minor | 0.096155222 |
| Alpha Minor | 0.959280918 |
| Omega Minor | 0.958143504 |

Then, the Bach ratios described above may be used to convert the 'A' in Ra format to any other note, i.e., 'B', 'C', 'D', 'E', 'F', or 'G'.

The above conversion ratios are determined by calculating the frequency of a note as defined in the Ra system and generating the ratio for ease of repeatability. Calculating the frequency of a note as defined in the Ra system is accomplished in the following manner.

Figure 1:
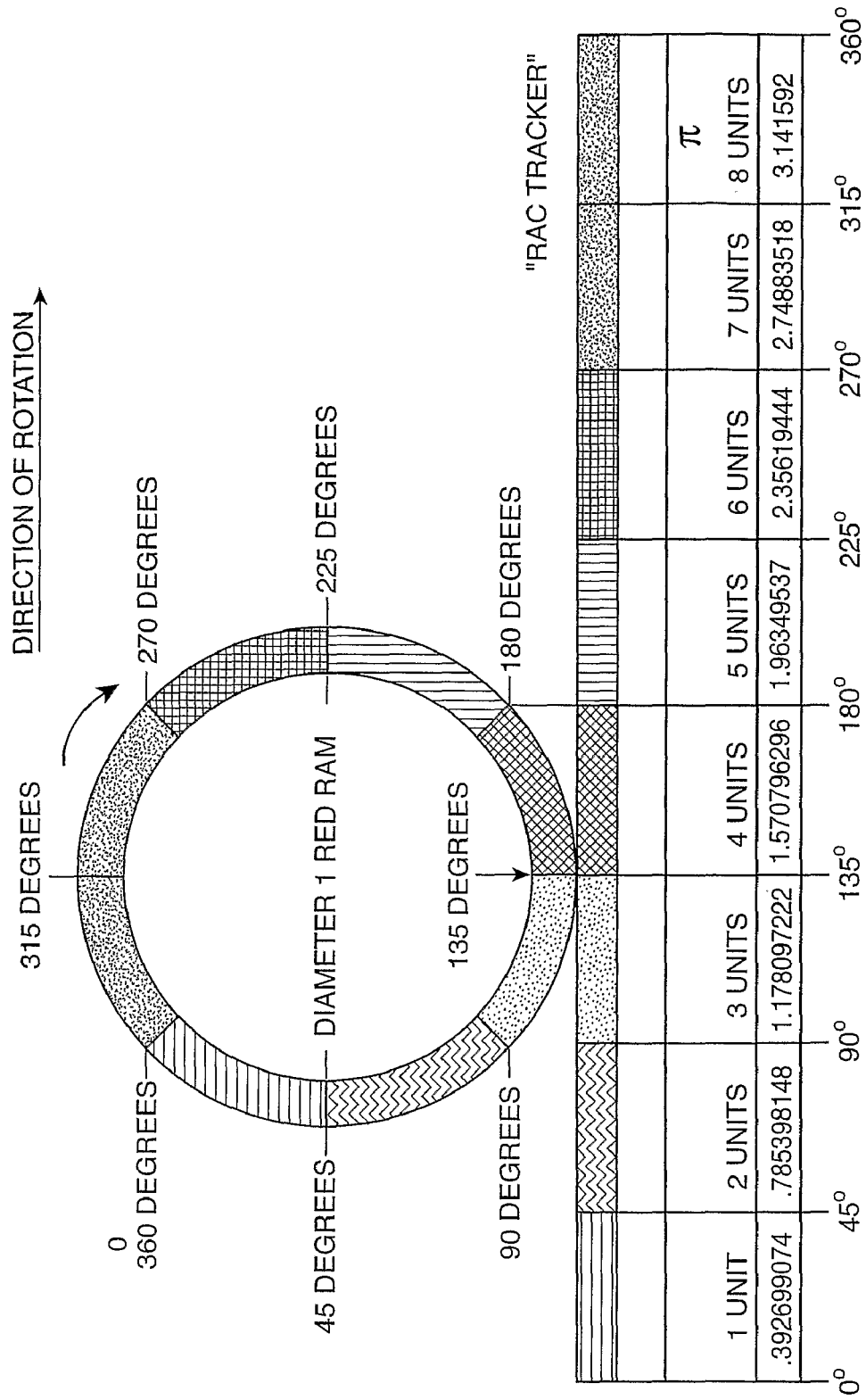
FIG. 1 is a schematic view of a Pi measuring wheel and related chart used in accordance with the present invention.

To calculate the frequency for each note in a Ra format, one must roll out a Pi wheel having the corresponding Ra format unit diameter as depicted in FIG. 1. The distance laid out per degree of the circle is used in a calculation to determine a corresponding note frequency in Ra format.

For example, as shown in FIG. 1, the length of the circumference of a wheel with 1 Red unit diameter is 3.141592592 - - - Red units (Red Pi). The distance traveled over a certain number of degrees corresponds to a specific octave of a particular note. The number of degrees for the $1^{st}$ octave of each note are as follows:

| | |
|---|---|
| A - | 60.75 |
| B - | 68.34375 |
| C - | 72.9 |
| D - | 82.0125 |
| E - | 91.125 |
| F - | 97.2 |
| G - | 109.35 |

The corresponding distances traveled for each of these degrees of rotation for each of the nine Ra formats are shown in FIGS. 2A through 2I. Mathematically, the distances are calculated by dividing the number of degrees by 360 and multiplying that value by the value of Pi for the corresponding Ra format. In the case of FIG. 1 and referring to FIG. 2E, the distance traveled for note 'C' is 72.9°÷360°×Red Pi (3.141592 - - - ), which equals 0.6361725. One hundred times any of these distance values gives the corresponding Ra format frequency for that note in the first octave. For the $1^{st}$ octave of Red 'C', this value is 63.61725 cycles per second.

Each successive octave is obtained by multiplying the frequency of the previous octave by 2, i.e., $1^{st}$ octave Red 'C' is 63.61725 Hz and the $2^{nd}$ octave Red 'C' is 127.2345 Hz. In addition, each successive octave may be calculated by multiplying the degrees to obtain the successive octave, i.e., the second octave of 'C' is 145.8° (72.9°×2) and the third octave of 'C' is 291.6° (145.8°×2). However, due to the large number of decimal places, calculating successive octaves by the later method increases mathematical error.

The $4^{th}$ octave of 'D' is 656.1 (2^3×82.0125) degrees of rotation. There are 656.1 Ra milli-microns in the Balmer m3 spectral line of hydrogen (visible).

The $6^{th}$ octave of 'D' is 2624.4 (2^5×82.0125) degrees of rotation. There are 2624.4 Ra milli-microns in the Brackett m3 spectral line for hydrogen (deep infra red).

The $3^{rd}$ octave of 'E' is 364.5 (2^2×91.125) degrees of rotation. The Balmer Constant is 91.125.

The $1^{st}$ octave of 'F' is 97.2 degrees of rotation. There are 97.2 Ra milli-microns in the Lyman m4 spectral line of hydrogen (visible).

The $2^{nd}$ octave of 'F' is 194.4 (2^1×97.2) degrees of rotation. There are 194.4 Ra milli-microns in the Brackett m8 spectral line of hydrogen (deep infra red).

The $3^{rd}$ octave of 'F' is 388.8 (2^2×97.2) degrees of rotation. There are 388.8 Ra milli-microns in the Balmer m8 spectral line of hydrogen (visible).

The $1^{st}$ octave of 'G' is 109.35 degrees of rotation. There are 109.35 Ra milli-microns in the Paschen m6 spectral line of hydrogen (near infra red).

The $4^{th}$ octave of A is 486 (2^3×60.75) degrees of rotation. There are 486 Ra milli-microns in the Balmer m4 spectral line of hydrogen (visible).

The $2^{nd}$ octave of A is 121.5 (2^1×60.75) degrees of rotation. There are 121.5 Ra milli-microns in the Lyman m2 spectral line of hydrogen (ultra violet). The most intense spectral line of hydrogen is 121.5 Ra milli-microns. The related Red 'A' frequency of 106.02875 approximates the average alpha wave produced by a meditating human being and the most frequently occurring elf wave generated by lightning. This is the Ra base line frequency from which all other harmonious Ra musical tones are derived.

The ratio of a n.s.t. to a standard second is used to convert Ra musical frequencies from cycles per n.s.t. to cycles per standard second of time. Musical instruments may be tuned to standard Ra tones in order to produce pleasing musical renditions. In addition, vintage musical recordings of any type may be processed (translated) to Ra tones per standard second seconds electronically by the Pyramid Processor and then re-recorded for repeated listening.

The Green Ra Tone Scale—Natural and Standard

The Ra formats relate to many aspects of nature and science. One relationship to be estimated is musical notes and their conversion to natural frequencies. In the Green Ra format, the following $1^{st}$ octave frequencies have been calculated per natural second of time (n.s.t.):

| | |
|---|---|
| A | 53.0330086 cycles per n.s.t. |
| B | 59.6621347 cycles per n.s.t. |
| C | 63.6396103 cycles per n.s.t. |
| D | 71.5945616 cycles per n.s.t. |
| E | 79.5495129 cycles per n.s.t. |
| F | 84.8528137 cycles per n.s.t. |
| G | 95.4594155 cycles per n.s.t. |

In the Green Ra format, the following $1^{st}$ octave frequencies have been calculated per standard second of time (s.s.t.):

| | |
|---|---|
| A | 52.9963197 cycles per s.s.t. |
| B | 59.6208597 cycles per s.s.t. |
| C | 63.5955836 cycles per s.s.t. |
| D | 71.5450315 cycles per s.s.t. |
| E | 79.4944795 cycles per s.s.t. |
| F | 84.7941115 cycles per s.s.t. |
| G | 95.3933754 cycles per s.s.t. |

Another method to find the tonal frequencies for the other Ra formats is to use the ratios that are evident when the Pi values of each format are mathematically compared to the Pi value for the Green format. For example, standard Green 'A' is 52.9963197 cycles per second. The ratio of Red Pi to Green Pi is 3.141592÷3.142696805 and that value multiplied by 52.9963197 cycles per second equals 52.977699 cycles per second. The standard Red 'A' is 52.977699 cycles per second. FIGS. 2A through 2I show the calculated conversion for the $1^{st}$ Octave of all nine Ra formats.

Method for Producing Musical Frequencies in All 9 Ra Formats

Having determined the natural values of the frequency of notes in standard seconds, the following will convert a composition or other series of musical notes into a Ra format based composition.

| | |
|---|---|
| Starting Frequency of note 'A' in standard cycles per second. | 440 Hz |
| Frequency of an Omega Major note 'A' | 426.3714936 Hz |

-continued

| | |
|---|---|
| In natural cycles per standard second. Percentage of change | 96.9026122% |
| Percentage of change converted to tuning change in 'cents' (a cent is 1/100th of a Semitone, a semitone is 1/12th of an octave). | −53 cents |

This conversion can be precisely demonstrated for all the values of the musical notes in the various Ra format scales. The table in FIG. 3 provides such a conversion for the note 'A' in the second and fourth octaves for all nine Ra formats.

The Pyramid Processor itself consists of 2 main parts: 1) a uniquely designed electronic device that recognizes standard forms of musical notes (frequencies) that were previously recorded on any type of existing recording medium; and 2) a hard wired or software program containing all Ra frequency scales.

The Pyramid Processor allows a user to select a single or any combination of compatible Ra frequency scales i.e., Green, Red, Blue, Red-Blue, and Red-Blue-Green, etc. It has been found that the formats of Red, Blue, and Green, in any combination or individually produce, the most pleasing sounds to a human being, although any of the nine Ra formats will operate under the present invention.

Figure 4:
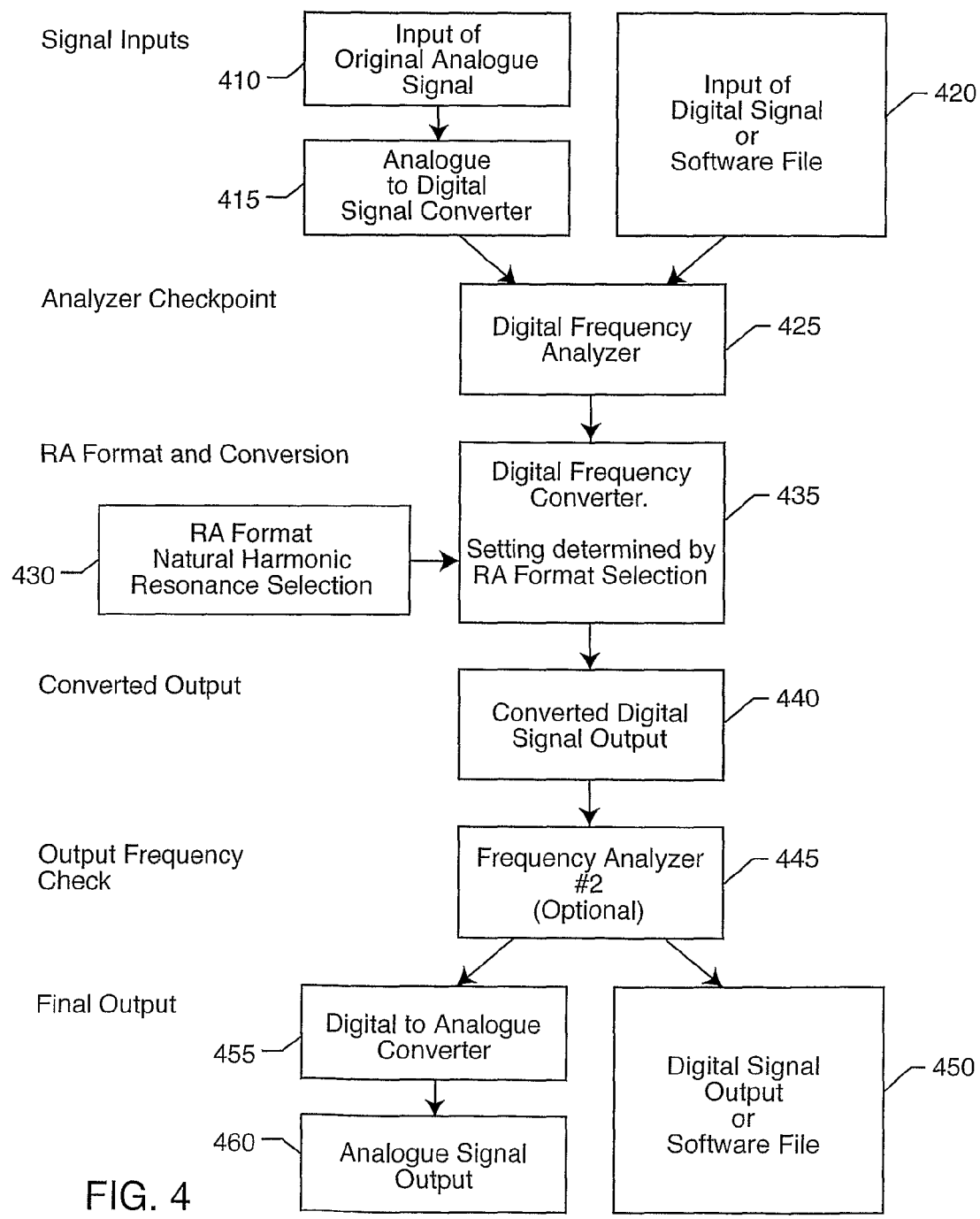
FIG. 4 is a flowchart illustrating the steps taken in a Pyramid Processor embodying the present invention.

During processing under the present invention, the frequencies of notes in standard music are converted into Ra frequencies as illustrated in the flowchart of FIG. 4. The result of the music conversion process is then saved or re-recorded for playback. This process can be either a real-time event or a non real-time event. Also it can be configured as a stand-alone device precisely related to uniquely designed software that is running as a program on a computer.

Figure 6:
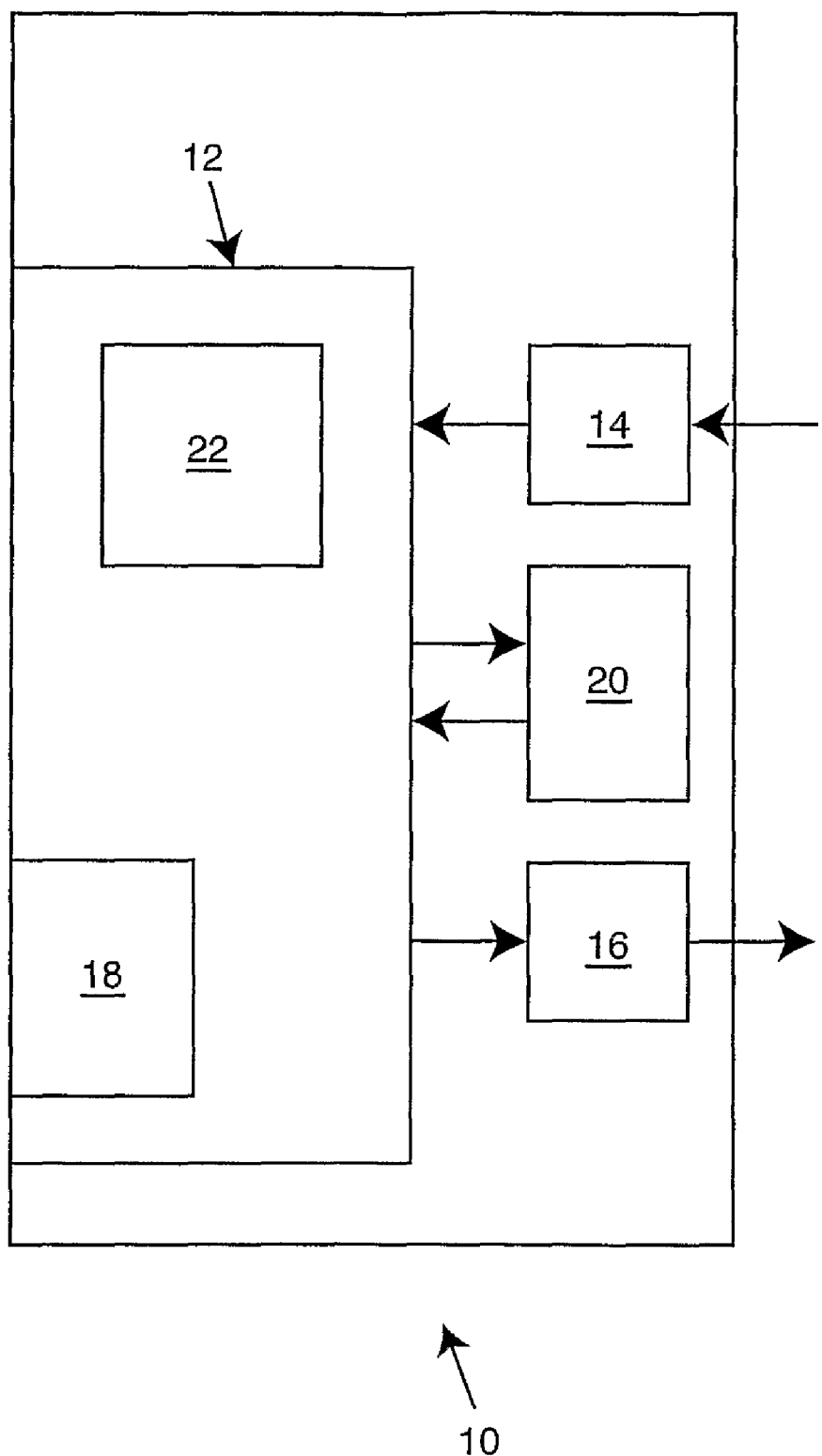
FIG. 6 is a schematic block diagram of a Pyramid Processor embodying the present invention.

FIG. 6 illustrates a schematic block diagram of the apparatus 10, of the present invention. An apparatus for converting the frequency of standard musical notes to a corresponding frequency of Ra format musical notes, i.e., the Pyramid Processor 10, comprising a processor 12 having a signal input port 14 for receiving a signal of standard musical notes and a signal output port for outputting a signal of Ra format musical notes. The processor 12 includes means for converting 22 the frequency of standard musical notes to a corresponding frequency of Ra musical notes using one of the conversion methods described above. The processor 12 also includes a means for selecting 18 a Ra format natural harmonic resonance. The Ra format natural harmonic resonance corresponds to a specific Ra format, i.e., Red, Green, Blue, etc., to which the apparatus will convert the standard musical notes. The apparatus 10 may also include a frequency analyzer 26 to determine the frequency of notes in the signal of standard musical notes as well as confirm the frequency of notes in the signal of Ra format musical notes.

The means for converting 22 may comprise either a software program containing conversions and/or frequencies for all Ra format natural harmonic resonances or hardware containing all Ra format natural harmonic resonances. The means for selecting 18 a Ra format natural harmonic resonance may comprise a switch, a dial, or multiple buttons having positions corresponding to a single Ra format or combinations of multiple Ra formats. As described above, the Pyramid Processor 10 may be configured to convert multiple audio channels into multiple corresponding Ra formats.

The signal input port 14 may be connected to a microphone for receiving a real time audio signal or may be connected to an audio device, i.e., a stereo receiver, for converting an audio signal from a non-real time event, i.e., prerecorded tape, compact disc, computer file, etc. The signal output port 16 may likewise be connected to another audio device, i.e., stereo receiver, for reproduction of the converted signal through the stereo speakers or re-recording of the converted signal. The means for recording may comprise a tape deck, CD burner, or other known recording device.

As shown in FIG. 4, the apparatus 10 that converts or shifts the frequencies of 'Standard' tunings to 'Natural' tunings has a flow chart as follows:

Original Signal=>Conversion Module=>Converted Signal

With reference to FIG. 4, the process employed in a Pyramid Processor device having a single channel is illustrated. Either a digital signal/software file (420) or an input of an original analog signal (410) which is then converted to a digital signal by a converter (415) is input into the Pyramid Processor. Whichever signal is input is then analyzed by a digital frequency analyzer (425). A Ra format for a natural harmonic resonance is selected (430) and a digital frequency converter converts the digital frequency to the setting determined by the Ra format natural harmonic resonance (435). The Pyramid Processor then outputs the converted digital signal (440). A second digital frequency analyzer may be used to confirm that the digital signal has been properly converted (445). The digital signal file is then output (450), or converted to an analog signal (455) and then output (460).

In modern audio production and reproduction, the signal path is anywhere from a single signal path to multiple signal paths or channels, i.e., right, left, center, surround, etc. This is to provide separate signal paths for each audio component. Therefore a conversion system would have multiple signal paths and processing as shown below:

Original signal 1=>Conversion Module 1=>Converted Signal 1

Original signal 2=>Conversion Module 2=>Converted Signal 2

Original signal 3=>Conversion Module 3=>Converted Signal 3

Original signal 4=>Conversion Module 4=>Converted Signal 4

Original signal 5=>Conversion Module 5=>Converted Signal 5

Original signal N=>Conversion Module N=>Converted Signal N

This would be true for 'N' numbers of channels that are necessary for any application.

FIG. 5 illustrates the process of converting a multi-channel, or multiple signal inputs. Essentially, the same process steps listed above are taken and repeated for each channel or signal input. These can then be simultaneously output and layered to create a stereo or multi-channel effect.

Although an embodiment has been described and illustrated, it should not be construed as limiting the scope of the invention as various modifications may be made without departing from the spirit and scope of the invention.

The invention claimed is:
1. An apparatus for converting the frequency of standard musical notes to a corresponding frequency of Ra format musical notes, comprising:
a processor having means for converting the frequency of standard musical notes to a corresponding frequency of

Ra formal musical notes, the processor including means for selecting a Ra format natural harmonic resonance;

a frequency analyzer electrically connected to the processor;

a signal input port electrically connected to the processor for receiving a signal of standard musical notes; and a signal output port electrically connected on the processor for outputting a signal of Ra format musical notes.

2. The apparatus of claim 1, wherein the means for converting comprises a software program containing Ra format natural harmonic resonances.

3. The apparatus of claim 1, wherein the means for converting comprises hardware containing Ra format natural harmonic resonances.

4. The apparatus of claim 1, wherein the means for selecting a Ra format natural harmonic resonance comprises means for selecting two or more Ra format natural harmonic resonances.

5. The apparatus of claim 4, wherein the means for selecting comprises a switch, a dial, or multiple buttons.

6. The apparatus of claim 1, further comprising an audio tuner electronically connected to the signal input port and the signal output port.

7. The apparatus of claim 6, further comprising means for recording electronically connected to the signal output.

\* \* \* \* \*